(12) United States Patent
Stringham (10) Patent No.: US 8,539,179 B1
(45) Date of Patent: Sep. 17, 2013

(54) METHODS AND SYSTEMS FOR CREATING FULL BACKUPS

(75) Inventor: Russell Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 650 days.

(21) Appl. No.: 12/415,798

(22) Filed: Mar. 31, 2009

(51) Int. Cl.
*G06F 12/00* (2006.01)
*G06F 13/00* (2006.01)
*G06F 13/28* (2006.01)

(52) U.S. Cl.
USPC .................................. 711/162; 711/E12.103

(58) Field of Classification Search
USPC ........................................... 711/162, E12.103
See application file for complete search history.

(56) References Cited

U.S. PATENT DOCUMENTS

| | | | | |
|---|---|---|---|---|
| 5,835,953 | A * | 11/1998 | Ohran | 711/162 |
| 6,981,114 | B1 * | 12/2005 | Wu et al. | 711/162 |
| 7,472,242 | B1 * | 12/2008 | Deshmukh et al. | 711/162 |
| 7,802,134 | B1 | 9/2010 | Sobel et al. | |
| 2010/0030959 | A1 * | 2/2010 | Satoyama et al. | 711/112 |

OTHER PUBLICATIONS

Russell Stringham; Final Office Action received in related U.S. Appl. No. 12/473,398; Nov. 10, 2011.
Stringham, Russell; Methods and Systems for Creating Full Backups; U.S. Appl. No. 12/473,398, filed May 28, 2009.
Non-Final Office Action received in related U.S. Appl. No. 12/473,398; Jul. 14, 2011.

* cited by examiner

*Primary Examiner* — Sheng-Jen Tsai
(74) *Attorney, Agent, or Firm* — ALG Intellectual Property, LLC (57) ABSTRACT

A computer-implemented method may create a first full backup of a set of data units at a first point in time. The method may create, at a second point in time, a representation of one or more data units in the set of data units that have been modified since the first point in time. The method may determine, based at least in part on the representation of one or more data units that have been modified since the first point in time, a difference between a state of the set of data units at the first point in time and a state of the set of data units at the second point in time. The method may use the difference to update the first full backup to a second full backup that comprises modifications made to the set of data units between the first and second points in time.

18 Claims, 7 Drawing Sheets

Original Volume
500

| Data | A | C | D | - | - | E | F | - | - | - | G | J |
|---|---|---|---|---|---|---|---|---|---|---|---|---|
| Index | 0 | 1 | 2 | 3 | 4 | 5 | 6 | 7 | 8 | 9 | 10 | 11 |

Backup Image of Original Volume
600

| Data | Hdr1 | A | C | D | E | F | G | J |
|---|---|---|---|---|---|---|---|---|
| Index | 0 | 1 | 2 | 3 | 4 | 5 | 6 | 7 |

Original Volume
500

| Data | A | C | D | - | - | E | F | - | - | - | G | J |
|---|---|---|---|---|---|---|---|---|---|---|---|---|
| Index | 0 | 1 | 2 | 3 | 4 | 5 | 6 | 7 | 8 | 9 | 10 | 11 |

*FIG. 5*

Backup Image of Original Volume
600

| Data | Hdr1 | A | C | D | E | F | G | J |
|---|---|---|---|---|---|---|---|---|
| Index | 0 | 1 | 2 | 3 | 4 | 5 | 6 | 7 |

*FIG. 6*

Incremental Backup
700

| Data | Hdr2 | C | K | L |
|---|---|---|---|---|
| Index | 0 | 1 | 2 | 3 |

*FIG. 7*

Changed Volume
800

| Data | A | - | D | - | - | E | F | C | - | K | G | L |
|---|---|---|---|---|---|---|---|---|---|---|---|---|
| Index | 0 | 1 | 2 | 3 | 4 | 5 | 6 | 7 | 8 | 9 | 10 | 11 |

*FIG. 8*

Bitmaps
900

| | | | | | | | | | | | | |
|---|---|---|---|---|---|---|---|---|---|---|---|---|
| Original Volume Bitmap | 1 | 1 | 1 | 0 | 0 | 1 | 1 | 0 | 0 | 0 | 1 | 1 |
| Changed Volume Bitmap | 1 | 0 | 1 | 0 | 0 | 1 | 1 | 1 | 0 | 1 | 1 | 1 |
| Incremental Bitmap | 0 | 0 | 0 | 0 | 0 | 0 | 0 | 1 | 0 | 1 | 0 | 1 |
| Iteration | 1 | 2 | 3 | 4 | 5 | 6 | 7 | 8 | 9 | 10 | 11 | 12 |

*FIG. 9*

Delta File
1000

| Data | Hdr3 | B1 | B3 | B4 | B5 | B2 | K | B6 | L |
|---|---|---|---|---|---|---|---|---|---|
| Index | 0 | 1 | 2 | 3 | 4 | 5 | 6 | 7 | 8 |

METHODS AND SYSTEMS FOR CREATING FULL BACKUPS

BACKGROUND

Traditional backup systems may periodically create a full backup by capturing all allocated blocks (e.g., sectors or clusters) of a volume. Between full backups, a backup system may capture intermediate backups, referred to as incremental backups, that include blocks that have changed since the previous incremental or full backup. An incremental backup may be orders of magnitude smaller and faster than a full backup. Because of the relative efficiency of incremental backups, many enterprises would prefer to take only incremental backups after an initial base backup (a feature referred to as infinite incrementals).

Unfortunately, some traditional backup technologies are not designed to effectively deal with long (or even short) chains of incremental backups. For example, some traditional backup systems may restore a volume (or any other backed-up entity) by opening and reading each backup in the entire chain of backups, including each incremental backup and a base backup (i.e., a full backup). Other traditional backup systems may only support opening a single file at a time when restoring a volume and therefore may not be able to handle chains of backups.

Because of the challenges associated with handling chains of incremental backups, many backup systems may take full backups periodically (e.g., weekly or monthly) and may take incremental backups between the full backups. Some traditional backup systems may perform differencing (i.e., determining a difference between a previous backup of a protected system and a current state of the protected system) to determine which data needs to be transmitted from the protected system for backup. The backup system may then construct and transmit a delta stream describing how the current backup differs from the previous backup. In certain systems, differencing may only be performed on full backups. In other systems, differencing may be performed on all backups.

In embodiments where the differencing is only applied to full backups, after a first base backup is created, incremental backups may be created without differencing. Systems that use such an approach may be inefficient because they may transmit a significant amount of backup data twice—once in an incremental backup and a second time in the next full backup. Extra storage and bandwidth may be consumed while handing the duplicate data.

As noted, an alternative approach to differencing only full backups may include differencing each backup, whether full or incremental. Differencing an incremental to a first full backup may result in discarding most of the full backup for use in subsequent differencing. The backup system may only apply differencing to the most recently saved version of the file, and as a result, a second full backup may only be compared to the incremental backup. Undesirably, differencing the second full backup to the incremental backup may result in retransmission of almost the entire second full backup.

An additional disadvantage of systems that perform differencing is the cost involved in performing the differencing. When processing a file (or other data unit) to prepare for differencing, a backup system may break the file up into blocks and may calculate hashes for each block. The backup system may compare a hash calculated for an old version of a block with a hash calculated for a current version of a block to determine whether data stored in the block has been modified. If the hashes do not match, the backup system may determine that the new version has been modified.

The amount of processing involved in creating and comparing hashes to identify changes may be substantial. For example, if a backup system is backing up 100 Gigabytes ("GB") of data of a volume, the backup system may transfer all 100 GB over a network for the first full backup. For the next full backup, 100 GB may be read from the volume and broken up into blocks. The backup system may then calculate hashes for all the blocks and may compare them with hashes of blocks of the first full backup. If 99% of the blocks are the same and 1% of the blocks are different, 1 GB may be sent to the backup system to create a new full backup. Despite the reduction in data transfer, the backup system may have consumed a significant amount of resources reading and processing the 100 GB of data of the volume. What is needed, therefore, is a more efficient system for creating backups.

SUMMARY

Embodiments of the present disclosure are directed to methods and systems for creating full backups. For example, a backup module may create a first full backup of a set of data units (e.g., a volume) at a first point in time. At a second point in time, the backup module may create a representation (e.g., an incremental backup and/or an incremental bitmap) of one or more data units in the set of data units that have been modified since the first point in time. A processing module may then determine, based at least in part on the representation of one or more data units that have been modified since the first point in time, a difference (e.g., a delta stream or file) between a state of the set of data units at the first point in time and a state of the set of data units at the second point in time. After determining this difference, an update module may use the difference to update the first full backup to a second full backup. The second full backup may include modifications made to the set of data units between the first and second points in time.

In some embodiments, the representation of one or more data units that have been modified since the first point in time may include a first bitmap that indicates each data unit (e.g., block) in the set of data units (e.g., volume) that has changed since the first point in time. Similarly, a second bitmap may indicate a state of each data unit in the set of data units at the first point in time, and a third bitmap may indicate a state of each data unit in the set of data units at the second point in time. In such embodiments, determining the difference may include comparing the first, second, and third bitmaps.

In some embodiments, determining the difference may comprise creating a delta (e.g., a delta stream or delta file) that comprises data for updating the first full backup to the second full backup, and the representation may include an incremental backup. Creating the delta may include, for each data unit in the set of data units: adding a data unit from the incremental backup corresponding to the data unit of the set of data units to the delta if (1) the bit corresponding to the data unit of the set of data units in the third bitmap is set and (2) the bit corresponding to the data unit of the set of data units in the first bitmap is set; adding a reference to a data unit in the first full backup if (1) the bit corresponding to the data unit of the set of data units in the third bitmap is set and (2) the bit corresponding to the data unit of the set of data units in the first bitmap is not set. In some embodiments, determining the difference may include converting the incremental backup into a delta. In other embodiments, the delta may be created on the fly (i.e., as part of the incremental backup).

Embodiments of the instant disclosure may be implemented in any backup system, such as an online backup systems and/or a data deduplication system. Features from any of the above-mentioned embodiments may be used in combination with one another in accordance with the general principles described herein. These and other embodiments, features, and advantages will be more fully understood upon reading the following detailed description in conjunction with the accompanying claims and drawings.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for creating full backups. In some embodiments, a backup module may create a first full backup of a volume (or other storage entity) at a first point in time. The backup module may create, at a second point in time, an incremental backup (or other representation) of one or more blocks (or other data units) in the volume that have been modified since the first point in time. A processing module may determine, based at least in part on the incremental backup, a delta file (or any other difference) between a state of the volume at the first point in time and a state of the volume at the second point in time. An update module may use the difference to update the first full backup to a second full backup. The second full backup may represent the state of the volume at the second point in time.

Embodiments of the instant disclosure may provide various features and advantages not provided by traditional backup systems. For example, some embodiments may create full backups for substantially the same cost, in terms of data transmission, input and output, and storage, as incremental backups. Furthermore, in some embodiments each backup after a base backup may be a synthetic full backup (e.g., a backup created by one or more processes disclosed herein). In such embodiments, a backup system may not need to expend the resources traditionally needed to create periodic full backups. Thus, a backup system may be able to create numerous full backups at a cost that may be roughly the same as the cost of creating incremental backups.

Figure 1:
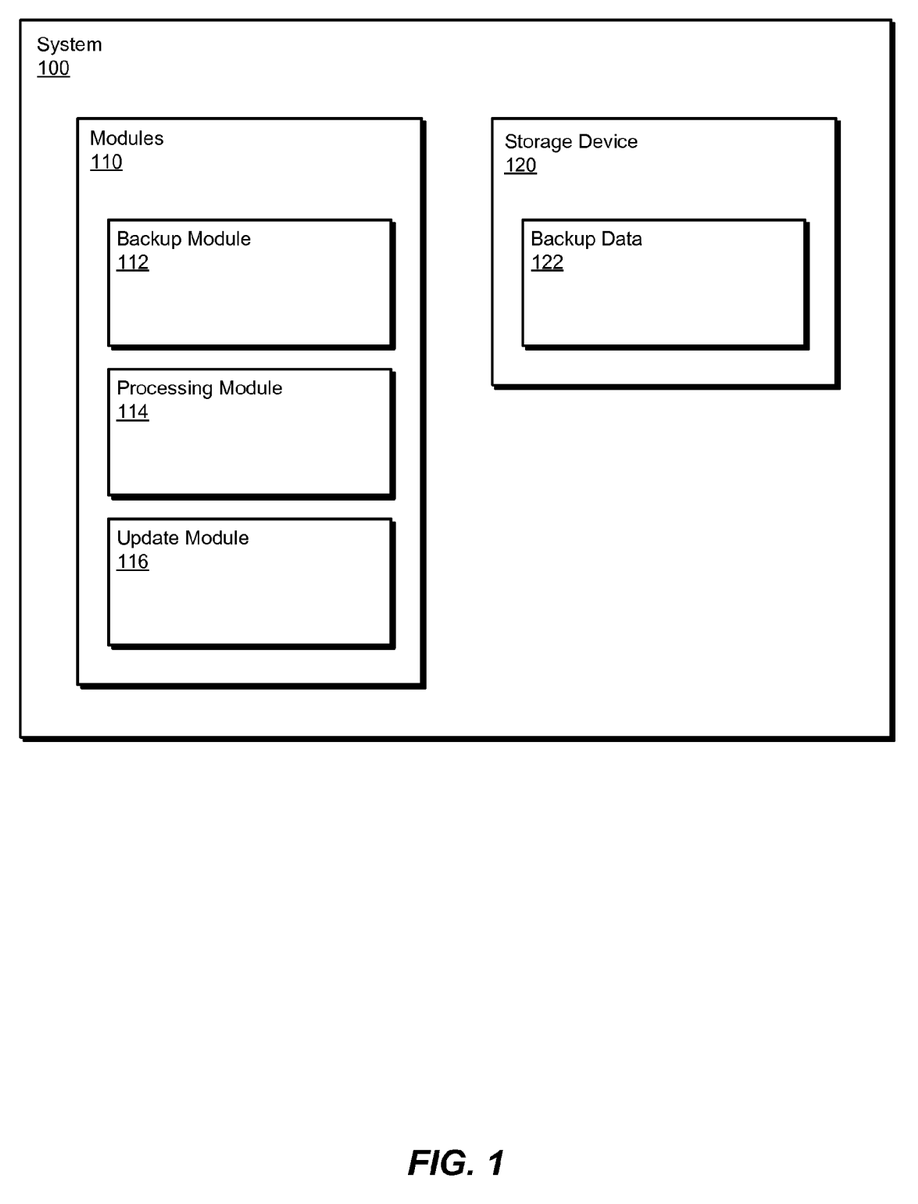
FIG. 1 is a block diagram of an exemplary system for creating full backups according to certain embodiments.
Figure 2:
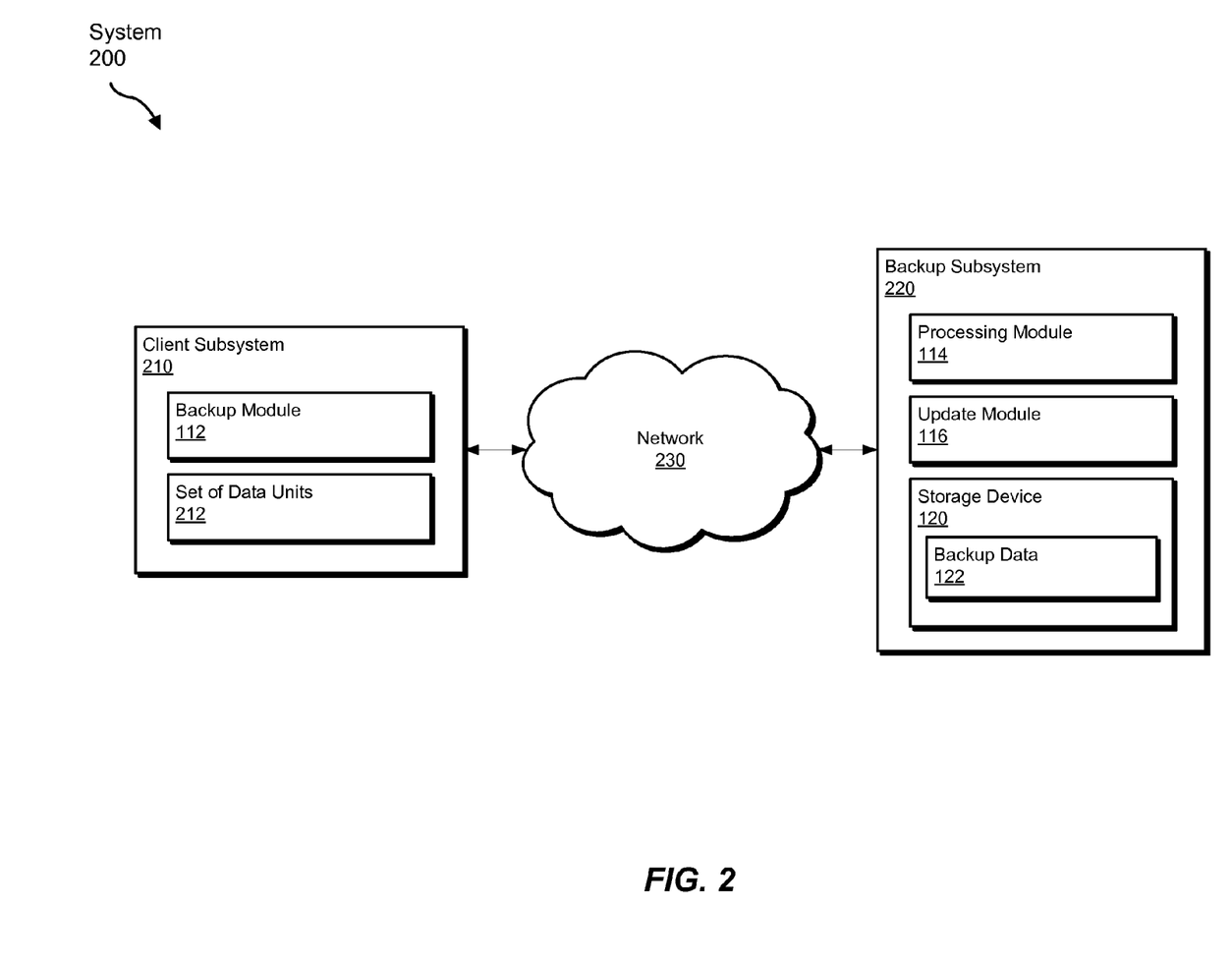
FIG. 2 is a block diagram of an implementation of the system illustrated in FIG. 1 according to certain embodiments.
Figure 3:
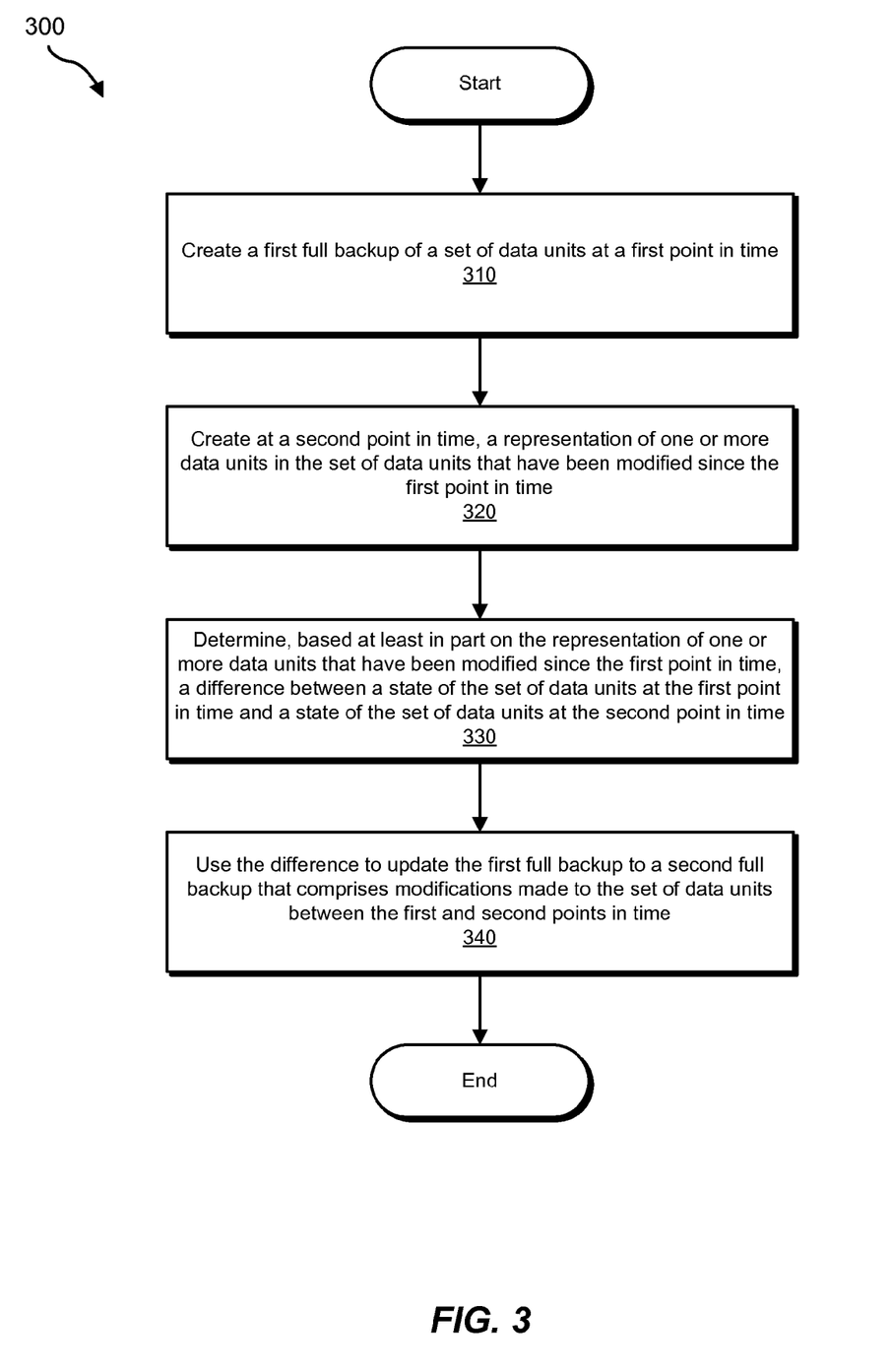
FIG. 3 is a flow diagram of an exemplary method for creating full backups according to certain embodiments.
Figure 4:
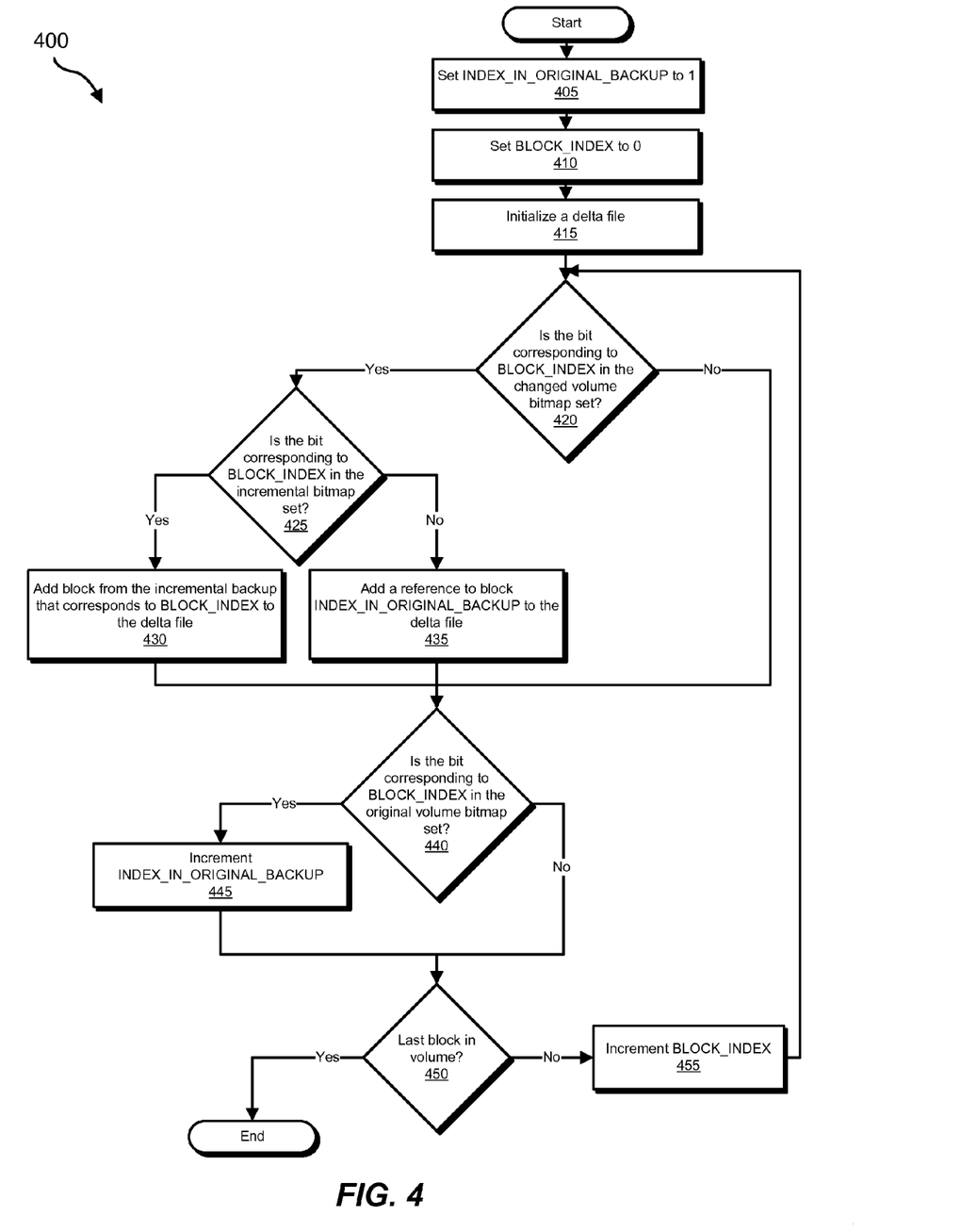
FIG. 4 is another flow diagram of an exemplary method for creating full backups according to certain embodiments.
Figure 11:
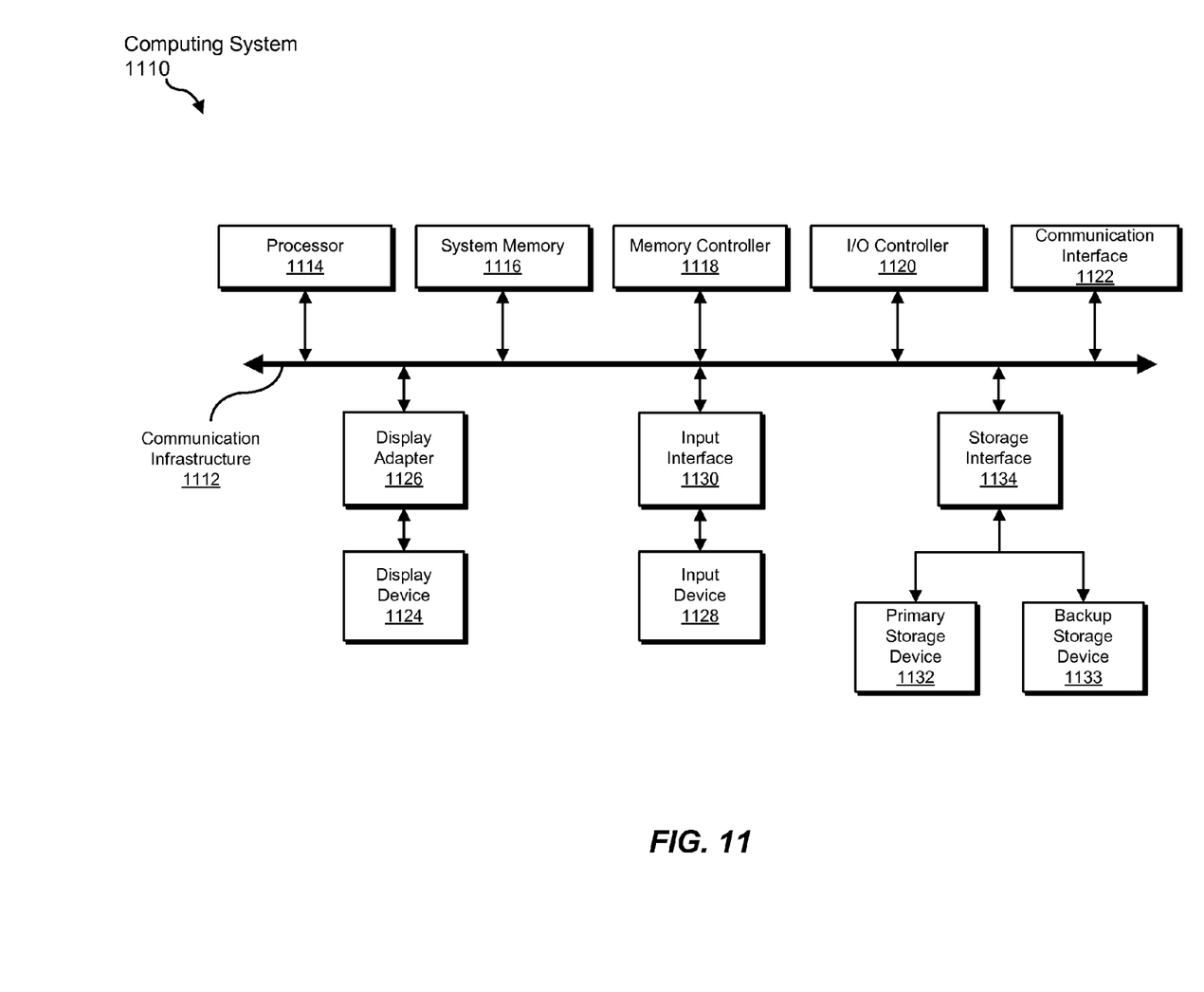
FIG. 11 is a block diagram of an exemplary computing system capable of implementing one or more of the embodiments described and/or illustrated herein.
Figure 12:
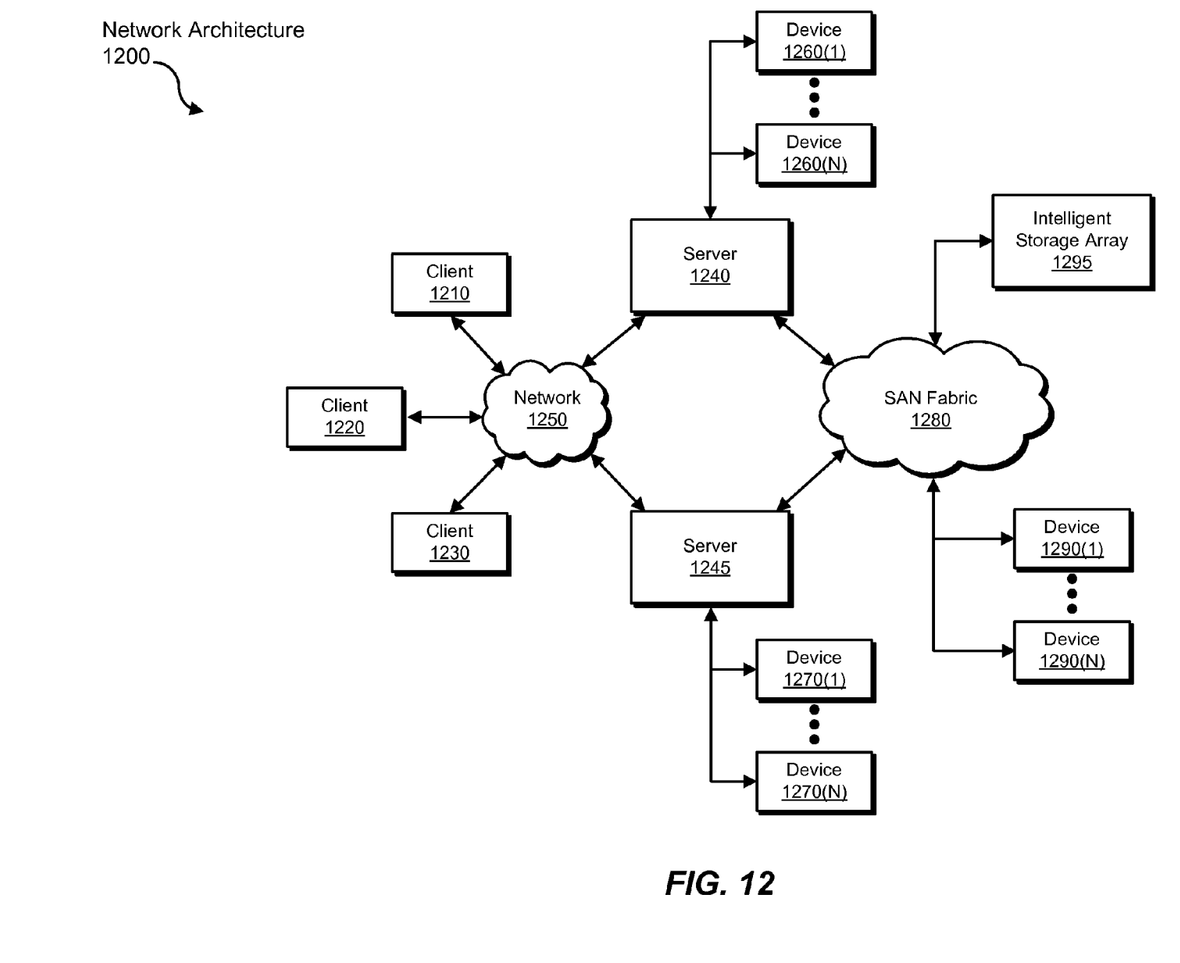
FIG. 12 is a block diagram of an exemplary computing network capable of implementing one or more of the embodiments described and/or illustrated herein.

FIGS. 1 and 2 show exemplary systems for creating full backups, and FIGS. 3 and 4 show exemplary methods for accomplishing the same. FIGS. 5-10 show exemplary block diagrams of volumes, images, and bitmaps involved in creating a full backup. FIGS. 11 and 12 illustrate an exemplary computing system and network architecture for implementing embodiments of the instant disclosure.

FIG. 1 illustrates a backup system 100 for creating full backups. System 100 may include modules 110 and a storage device 120. Modules 110 may include a backup module 112, a processing module 114, and an update module 116. Backup module 112 may be programmed to create a first full backup of a set of data units at a first point in time and to create, at a second point in time, a representation of one or more data units in the set of data units that have been modified since the first point in time. Processing module 114 may be programmed to determine, based at least in part on the representation of one or more data units that have been modified since the first point in time, a difference between a state of the set of data units at the first point in time and a state of the set of data units at the second point in time. Update module 116 may be programmed to use the difference to update the first full backup to a second full backup that comprises modifications made to the set of data units between the first and second points in time.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 1110 in FIG. 11 and/or portions of exemplary network architecture 1200 in FIG. 12. One or more of modules 110 in FIG. 1 may also represent all or portions of one or more special-purpose computers configured to perform one or more of the tasks associated with steps disclosed herein.

As previously noted, system 100 may include a storage device 120. Storage device 120 may represent any storage hardware and/or software, such as storage device 1132 and/or 1133 in FIG. 11. Storage device 120 may generally represent any type or form of storage device or medium capable of storing data. Storage device 120 may include a backup data 122, which may comprise backup data from one or more client devices.

FIG. 2 illustrates a system 200 that provides an exemplary configuration of components of system 100. System 200 may include a client subsystem 210, a backup subsystem 220, and a network 230. Client subsystem 210 and/or backup subsystem 220 generally represent any type or form of computing device capable of reading computer-executable instructions. Examples of client subsystem 210 and/or backup subsystem 220 include, without limitation, laptops, desktops, servers, cellular phones, personal digital assistants ("PDAs"), multimedia players, embedded systems, combinations of one or more of the same, exemplary computing system 1110 in FIG. 11, or any other suitable computing device.

Client subsystem 210 may include backup module 112 and a set of data units 212. Set of data units 212 may generally represent any set of one or more units of data that may be backed up to backup subsystem 220. A set of data units may include any physical and/or logical storage entity. For example, a set of data units may include a volume, a physical disk, a virtual disk, a partition on a drive, a set of one or more data entities (e.g., files, blocks, clusters), and/or any other data storage area.

Backup subsystem 220 may include processing module 114, update module 116, and storage device 120. Backup subsystem 220 may represent any system for backing up and/or recovering data. In some embodiments, backup subsystem 220 may include an online backup system (e.g., SYMANTEC PROTECTION NETWORK). Additionally or alternatively, backup subsystem 220 may include a data deduplication system.

Client subsystem 210 and backup subsystem 220 may communicate over network 230. Network 230 generally represents any medium or architecture capable of facilitating communications or data transfer. Network 230 may include, without limitation, the Internet, a wide area network ("WAN"), a local area network ("LAN"), a personal area network ("PAN"), the Internet, Power Line Communications ("PLC"), a cellular network (e.g., a GSM network), or the like. Network 230 may facilitate communication or data transfer using wireless and/or wired communications.

FIG. 3 shows an exemplary method for creating a full backup. The steps shown in FIG. 3 may be performed by any suitable computer-executable code and/or computing system. In some embodiments, the steps shown in FIG. 3 may be performed by one or more of backup module 112, processing module 114, and/or update module 116. For example, at step 310, backup module 112 may create a first full backup of set of data units 212 at a first point in time.

As used herein, the phrase "full backup" may refer to any data backup that includes each data unit (e.g., block, sector, cluster, file, etc.) in a set of data units. For example, a full backup of a volume may include each block in the volume. In some embodiments, a full backup may include only those files which have been identified for backup, which means that a full backup may include a subset of the data on a system or volume. In other embodiments, a full backup may include a copy of all data and/or software on a system. For example, a full backup may include an entire data store, regardless of whether or not that data has been changed since a previous backup was performed. A full backup may include all data needed for a complete system restoration. A full backup may be a starting point for other backups (e.g., incremental backups).

While backup module 112 is shown on client subsystem 210, all or a portion of backup module 112 may also be located on backup subsystem 220. Client subsystem 210 may coordinate with backup subsystem 220 to transfer data to backup subsystem 220 and to create a full backup of set of data units 212. A first full backup of set of data units 212 may be created using any suitable data backup technology.

At step 320, backup module 112 may create, at a second point in time, a representation of one or more data units in set of data units 212 that have been modified since the first point in time. In some embodiments, the representation of one or more data units that have been modified since the first point in time may include a bitmap that indicates each data unit that has changed since the first point in time. This bitmap may be referred to as an incremental bitmap because it may show incremental changes in set of data units 212 since the first point in time. Instead of and/or in addition to a bitmap, the representation may include any other data that shows changes to set of data units 212 since the first point in time. For example, the representation of one or more data units that have been modified since the first point in time may include a change list which identifies the set of data units 212 that have changed. The change list may be implemented as a run-list of blocks that have changed and/or as a list of files.

In some embodiments, the representation of one or more data units that have been modified since the first point in time may include an incremental backup or a snapshot. An incremental backup may be created and may later be modified to create a delta stream or delta file for updating a previous backup. Alternatively, the representation of one or more data units may be used to create a delta stream or delta file on the fly, without first creating an incremental backup.

Backup module 112 may determine which data units in set of data units 212 have changed in a variety of ways. In some embodiments, backup module 112 may determine which data units in the set of data units 212 have been modified by tracking modifications to set of data units 212. Additionally or alternatively, backup module 112 may read archive bits associated with files in set of data units 212 to determine whether the files have changed since the most recent full backup.

At step 330, processing module 114 may determine a difference between a state of set of data units 212 at the first point in time and a state of set of data units 212 at the second point in time. The difference may be determined based at least in part on the representation of one or more data units that have been modified since the first point in time.

In some embodiments, client subsystem 210 may send the representation of one or more data units to backup subsystem 220, and backup subsystem 220 may process the representation to determine the difference between the state of the set of data units at the first point in time and the state of the set of data units at the second point time. In other embodiments, processing module 114 may be installed on client subsystem 210, and the difference may be determined on client subsystem 210 and transferred to backup subsystem 220 over network 230.

In some embodiments, determining the difference may include comparing various bitmaps. For example, an original system bitmap may indicate a state of each data unit in the set of data units at the first point in time. A changed system bitmap may indicate a state of each data unit in the set of data units at the second point in time. The representation of one or more data units that have been modified since the first point in time may include an incremental bitmap that indicates each data unit that has changed since the first point in time. In such embodiments, determining the difference may include comparing the original system bitmap, the changed system bitmap, and the incremental bitmap.

Determining the difference may include creating a delta that comprises data for updating the first full backup to the second full backup. The delta may include a delta stream sent to backup system 220. The delta stream may include a stream of data that includes the one or more data units that have been modified since the first point in time, and backup system 220 may use the delta stream to update the first full backup to a second full backup. Backup system 220 may also store the delta stream, performing generation of a second full backup only if and when such a backup set is actually needed.

In other embodiments, the delta may be a delta file that includes the one or more data units that have been modified since the first point in time. The delta file may be created on client subsystem 210 and transferred to backup subsystem 220, where it may be used to update the first full backup. Alternatively, backup subsystem 220 may receive an incremental backup and may convert the incremental backup into a delta file for updating the first full backup.

Any suitable algorithm may be implemented for creating the delta stream or delta file. For example, some algorithms may include the following steps for each data unit U in the set of data units: adding the data unit from the incremental backup corresponding to U to the delta if (1) the bit corresponding to U in the new system bitmap is set and (2) the bit corresponding to U in the incremental bitmap is set; and adding a reference to a data unit in the first full backup if (1) the bit corresponding to U in the new system bitmap is set and (2) the bit corresponding to U in the incremental bitmap is not set. Additional details on algorithms for creating delta files and streams are provided in FIGS. 4-10.

At step 340, update module 116 may use the difference (e.g., the delta file or stream) to update the first full backup to a second full backup that comprises modifications made to set of data units 212 between the first and second points in time. For example, update module 116 may update blocks in the first full backup with the changed data units from set of data units 212. The delta file or stream may provide information regarding how the modified data units map to the first full backup to create a second backup that represents the state of set of data units 212 at the second point in time. Update module 116 may overwrite, move, and/or otherwise modify data units in the first full backup to update the first full backup.

In some embodiments, a backup system may write full backups to a deduplication system. Rather than passing the full data set to the deduplication system, the backup system may only provide references to sections of the previous backup that have not changed and may only provide the incremental data that has changed in accordance with embodiments described herein. As a result, the deduplication system may only need to process (perform deduplication) on the changed data, but would give the effect of a full backup every time. Thus, complete individual files may be present in the captured blocks of the backup, which may be advantageous to deduplication systems that attempt to identify full files within a backup system.

The following discussion of FIGS. 4-10 provides an example of creating a delta. The steps in FIG. 4 may be performed by processing module 114. FIG. 4 shows a method that corresponds to the following pseudo code:
INDEX_IN_ORIGINAL_BACKUP=1
Delta file=Header
For each block BLOCK_INDEX in volume:
  If bit corresponding to BLOCK_INDEX in Changed Volume Bitmap is set:
    If bit corresponding to BLOCK_INDEX in Incremental Bitmap is set:
      Add block from incremental backup corresponding to BLOCK_INDEX to Delta
    Else
      Add reference to block INDEX_IN_ORIGINAL_BACKUP to the delta file   If bit corresponding to BLOCK_INDEX in Original Volume Bitmap is set:
    Increment INDEX_IN_ORIGINAL_BACKUP At step 405, processing module 114 may set a variable "INDEX_IN_ORIGINAL_BACKUP" to 1. At step 410, processing module 114 may set a variable "BLOCK INDEX" to 0. At step 415, processing module 114 may initialize a delta file. For example, processing module 114 may add header information to a delta file.

Processing module 114 may perform steps 420-445 for each block in a backed-up volume. For example, at decision point 420 processing module 114 may determine whether the bit corresponding to BLOCK_INDEX in a changed volume bitmap is set. If the bit corresponding to BLOCK_INDEX in the changed volume bitmap is set, at decision point 425 processing module 114 may determine whether the bit corresponding to BLOCK_INDEX in an incremental bitmap is set. If the bit corresponding to BLOCK_INDEX in the incremental bitmap is set, at step 430 processing module 114 may add a block corresponding to BLOCK_INDEX to the delta file. Otherwise, at step 435 processing module 114 may add a reference to a block corresponding to INDEX_IN_ORIGINAL_BACKUP to the delta file.

At decision point 440, processing module 114 may determine whether the bit corresponding to BLOCK_INDEX in an original system bitmap is set. If the bit corresponding to BLOCK_INDEX in the original system bitmap is set, at step 445 processing module 114 may increment INDEX_IN_ORIGINAL_BACKUP. At decision point 450, processing module may determine whether BLOCK_INDEX is at the last block in the volume. If it is not, processing module may increment BLOCK_INDEX and repeat steps 420-450. If BLOCK_INDEX is at the last block in the volume, process 400 may terminate.

Figure 5:
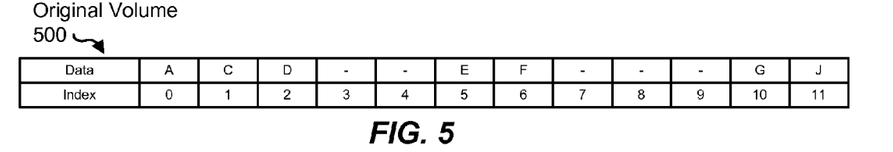
FIG. 5 is a block diagram of data in an original volume according to certain embodiments.
Figure 6:
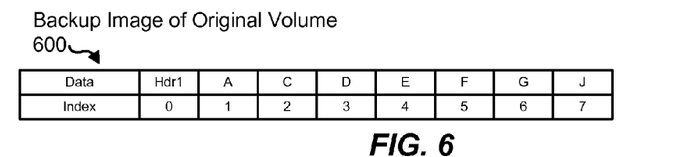
FIG. 6 is a block diagram of data in a backup image of the original volume shown in FIG. 5.
Figure 7:
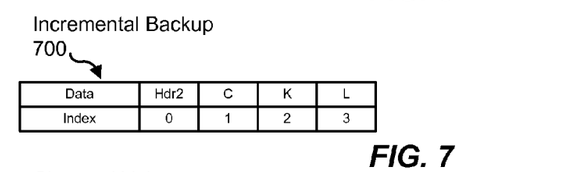
FIG. 7 is a block diagram of data in an incremental backup of the volume shown in FIG. 5.
Figure 8:
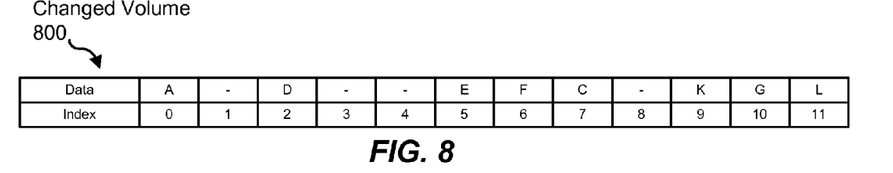
FIG. 8 is a block diagram of the volume shown in FIG. 5 after changes have been made to the volume.
Figure 9:
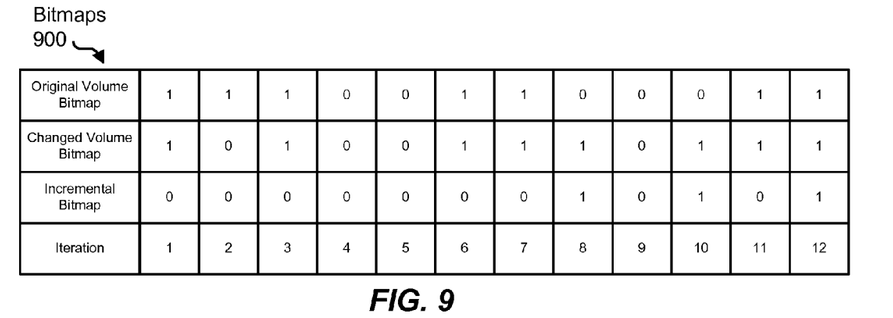
FIG. 9 is a block diagram of exemplary bitmaps associated with the volume shown in FIG. 5, the changed volume shown in FIG. 8, and the incremental backup shown in FIG. 7.
Figure 10:
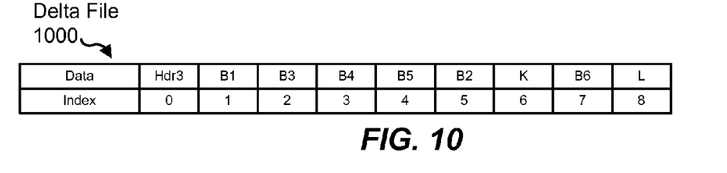
FIG. 10 is a block diagram of data in an exemplary delta file.

The following discussion presents an example of how a delta file may be created by applying the method shown in FIG. 4 to the volumes, backups, and bitmaps shown in FIGS. 5-10. FIG. 5 shows an original volume 500, which may represent a volume that is backed up by backup module 112. It is noted that data blocks with different letters may have different data, while blocks with the same letter (at later points in time) may contain identical data. Furthermore, data blocks with dashes are blocks that are not allocated by the file system at the first point in time or are excluded from the full backup for any other reason. FIG. 6 shows a backup image 600 of original volume 500. Backup module 112 may create backup image 600 at a first point in time. FIG. 7 shows an incremental backup 700 that includes the modified blocks in changed volume 800 (the blocks in changed volume 800 that are different than blocks in original volume 500). FIG. 8 shows a changed volume 800. FIG. 8 represents the state of original volume 500 at a second point in time, after changes have been made. FIG. 9 shows exemplary bitmaps 900 associated with original volume 500, changed volume 800, and incremental backup 700, and FIG. 10 shows a delta file 1000 created by the process of FIG. 4. In FIG. 10, data is represented by the notation B#, where # is a reference number that references the block at index # in the original volume backup 600.

In a first iteration through FIG. 4, the bit corresponding to BLOCK_INDEX is set in the Changed Volume Bitmap, but the bit corresponding to BLOCK_INDEX is not set in the Incremental Bitmap, so a reference to block INDEX_IN_ORIGINAL_BACKUP is added to the delta file, such that the delta file includes "Hdr3, B1." Since the bit corresponding to BLOCK_INDEX is set in the original volume bitmap, INDEX_IN_ORIGINAL_BACKUP is then incremented to 2. In the second iteration, the bit corresponding to BLOCK- _INDEX is not set in the Changed Volume Bitmap, so nothing is added to the delta file, but because the bit corresponding to BLOCK_INDEX is set in the Original Volume Bitmap, INDEX_IN_ORIGINAL_BACKUP is incremented to 3. Following the same process, after the third iteration the delta file includes "Hdr3, B1, B3," and INDEX_IN_ORIGINAL_BACKUP is incremented to 4.

No changes are made to the delta or INDEX_IN_ORIGINAL_BACKUP during the fourth or fifth iterations, and during the sixth iteration the delta file is updated to "Hdr3, B1, B3, B4." During the sixth iteration, INDEX_IN_ORIGINAL_BACKUP is incremented to 5. During the seventh iteration the delta file is updated to "Hdr3, B1, B3, B4, B5," and INDEX_IN_ORIGINAL_BACKUP is incremented to 6. During the eighth iteration, the bit corresponding to BLOCK_INDEX is set in the Changed Volume Bitmap and is also set in the Incremental Bitmap. Therefore, processing module 114 may add the block corresponding to BLOCK_INDEX (block C) to the delta file. While processing module 114 may include block C in the delta file, a deduplication or backup system would be able to discover that C is the same as the data in location 2 of the previous backup, so the deduplication or backup system may substitute a reference to location 2 for block C in the delta file. Thus, the delta file may include "Hdr3, B1, B3, B4, B5, B2," and INDEX_IN_ORIGINAL_BACKUP may be incremented to 6.

Processing module 114 may not make any changes during the ninth iteration, and during the tenth iteration processing module 114 may determine that the bits corresponding to BLOCK_INDEX are set in the changed volume bitmap and in the incremental bitmap. Processing module 114 may therefore read the block corresponding to BLOCK_INDEX of the changed volume (block K) out of the incremental image. Block K may be added to the delta file such that the delta file includes "Hdr3, B1, B3, B4, B5, B2, K." During the eleventh iteration the delta file may be updated to "Hdr3, B1, B3, B4, B5, B2, K, B6," and INDEX_IN_ORIGINAL_BACKUP may be updated to 7. During the twelfth and final iteration, the delta file may be updated to "Hdr3 B1, B3, B4, B5, B2, K, B6, L," as shown in delta file 1000 in FIG. 10. Update module 116 may then use delta file 1000 to update backup image of original volume 600. By updating a backup, update module 116 may transform a backup from a representation of a volume at a first point in time to a representation of the volume at a second point in time.

FIG. 11 is a block diagram of an exemplary computing system 1110 capable of implementing one or more of the embodiments described and/or illustrated herein. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may comprise at least one processor 1114 and system memory 1116.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the exemplary embodiments described and/or illustrated herein. For example, processor 1114 may perform and/or be a means for performing, either alone or in combination with other elements, one or more of the creating, determining, using, comparing, updating, adding, converting, sending, and deduplicating steps described herein. Processor 1114 may also perform and/or be a means for performing any other steps, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing system 1110 may comprise both a volatile memory unit (such as, for example, system memory 1116) and a non-volatile storage device (such as, for example, primary storage device 1132, as described in detail below).

In certain embodiments, exemplary computing system 1110 may also comprise one or more components or elements in addition to processor 1114 and system memory 1116. For example, as illustrated in FIG. 11, computing system 1110 may comprise a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an ISA, PCI, PCIe, or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller 1118 may perform and/or be a means for performing, either alone or in combination with other elements, one or more of the steps or features described and/or illustrated herein, such as creating, determining, using, comparing, updating, adding, converting, sending, and deduplicating.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134. I/O controller 1120 may be used, for example, to perform and/or be a means for performing one or more of the creating, determining, using, comparing, updating, adding, converting, sending, and deduplicating steps described herein. I/O controller 1120 may also be used to perform and/or be a means for performing other steps and features set forth in the instant disclosure.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network comprising additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution. In certain embodiments, communication interface 1122 may perform and/or be a means for performing, either alone or in combination with other elements, one or more of the creating, determining, using, comparing, updating, adding, converting, sending, and deduplicating steps disclosed herein. Communication interface 1122 may also be used to perform and/or be a means for performing other steps and features set forth in the instant disclosure.

As illustrated in FIG. 11, computing system 1110 may also comprise at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also comprise at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device. In at least one embodiment, input device 1128 may perform and/or be a means for performing, either alone or in combination with other elements, one or more of the creating, determining, using, comparing, updating, adding, converting, sending, and deduplicating steps disclosed herein. Input device 1128 may also be used to perform and/or be a means for performing other steps and features set forth in the instant disclosure.

As illustrated in FIG. 11, exemplary computing system 1110 may also comprise a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also comprise other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Storage devices 1132 and 1133 may also be used, for example, to perform and/or be a means for performing, either alone or in combination with other elements, one or more of the identifying, creating, determining, using, comparing, updating, adding, converting, sending, and deduplicating steps disclosed herein. Storage devices 1132 and 1133 may also be used to perform and/or be a means for performing other steps and features set forth in the instant disclosure.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an application specific integrated circuit (ASIC) adapted to implement one or more of the exemplary embodiments disclosed herein.

FIG. 12 is a block diagram of an exemplary network architecture 1200 in which client systems 1210, 1220, and 1230 and servers 1240 and 1245 may be coupled to a network 1250.

Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or to run certain software applications. Network 1250 generally represents any telecommunication or computer network; including, for example, an intranet, a wide area network (WAN), a local area network (LAN), a personal area network (PAN), or the Internet.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent network-attached storage (NAS) devices configured to communicate with servers 1240 and 1245 using various protocols, such as NFS, SMB, or CIFS.

Servers 1240 and 1245 may also be connected to a storage area network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250. Accordingly, network architecture 1200 may perform and/or be a means for performing, either alone or in combination with other elements, one or more of the creating, determining, using, comparing, updating, adding, converting, sending, and deduplicating steps disclosed herein. Network architecture 1200 may also be used to perform and/or be a means for performing other steps and features set forth in the instant disclosure.

As detailed above, computing system 1110 and/or one or more components of network architecture 1200 may perform and/or be a means for performing, either alone or in combination with other elements, one or more steps of the exemplary methods described and/or illustrated herein. For example, a computing system (e.g., computing system 1110 and/or one or more of the components of network architecture 1200) may perform a computer-implemented method for creating full backups. For example, the computing system may create a first full backup of a set of data units at a first point in time. The computing system may create, at a second point in time, a representation of one or more data units in the set of data units that have been modified since the first point in time. The computing system may determine, based at least in part on the representation of one or more data units that have been modified since the first point in time, a difference between a state of the set of data units at the first point in time and a state of the set of data units at the second point in time. The computing system may further use the difference to update the first full backup to a second full backup that comprises modifications made to the set of data units between the first and second points in time.

In certain embodiments, the representation of one or more data units that have been modified since the first point in time may include: a first bitmap that indicates each data unit that has changed since the first point in time, a second bitmap that indicates a state of each data unit in the set of data units at the first point in time, and a third bitmap that indicates a state of each data unit in the set of data units at the second point in time. The computing system may determine the difference by comparing the first, second, and third bitmaps. In some embodiments, the computing system may determine the difference by creating a delta that may include data for updating the first full backup to the second full backup.

In various embodiments, the delta may comprise a delta stream sent to a backup system that stores the first full backup. In other embodiments, the delta stream may comprise a stream of data that includes the one or more data units that have been modified since the first point in time. In at least one embodiment, the delta may comprise a delta file that includes the one or more data units that have been modified since the first point in time.

In certain embodiments, the representation may comprise an incremental backup that includes the one or more data units that have been modified. The computing system may create the delta by, for each data unit in the set of data units, adding a data unit from the incremental backup corresponding to the data unit of the set of data units to the delta if the bit corresponding to the data unit of the set of data units in the third bitmap is set and the bit corresponding to the data unit of the set of data units in the first bitmap is set. The computing system may also create the delta by, for each data unit in the set of data units, adding a reference to a data unit in the first full backup if the bit corresponding to the data unit of the set of data units in the third bitmap is set and the bit corresponding to the data unit of the set of data units in the first bitmap is not set.

In some embodiments, the representation of one or more data units that have been modified since the first point in time may include an incremental backup. The computing system may determine the difference by converting the incremental backup into a delta, wherein the difference may include the delta. In certain embodiments, the set of data units may include a data volume, and each data unit in the set of data units may comprise a data block. In at least one embodiment, the data block may comprise at least one of a data sector and a data cluster.

In various embodiments, the computing system may send the difference to a data reduplication system, wherein using the difference to update the first full backup to the second full backup may comprise deduplicating data in the difference and the first full backup. In some embodiments, the computing system may create, at a third point in time, a representation of one or more data units in the set of data units that have been modified since the second point in time. The computing system may determine, based at least in part on the representation of one or more data units that have been modified since the second point in time, a difference between the state of the set of data units at the second point in time and a state of the set of data units at the third point in time. The computing system may use the difference to update the second full backup to a third full backup that comprises modifications made to the set of data units between the second and third points in time.

In certain embodiments, a computing system may include at least one processor. The computing system may also include a backup module. The backup module may create a first full backup of a set of data units at a first point in time. The backup module may also create, at a second point in time, a representation of one or more data units in the set of data units that have been modified since the first point in time. The computing system may include at least one storage device configured to store the first full backup. The computing system may also include a processing module that may determine, based at least in part on the representation of one or more data units that have been modified since the first point in time, a difference between a state of the set of data units at the first point in time and a state of the set of data units at the second point in time. The computing system may include an update module that may use the difference to update the first full backup to a second full backup that comprises modifications made to the set of data units between the first and second points in time.

In various embodiments, the representation of one or more data units that have been modified since the first point in time may include: a first bitmap that indicates each data unit that has changed since the first point in time, a second bitmap that indicates a state of each data unit in the set of data units at the first point in time, and a third bitmap that indicates a state of each data unit in the set of data units at the second point in time. The computing system may determine the difference by comparing the first, second, and third bitmaps. In other embodiments, the processing module may direct the at least one processor to create a delta that may include data for updating the first full backup to the second full backup.

In certain embodiments, the delta may comprise a delta stream sent to a backup system that stores the first full backup, and the delta stream may comprise a stream of data that includes the one or more data units that have been modified since the first point in time. In other embodiments, the delta may comprise a delta file that includes the one or more data units that have been modified since the first point in time.

In various embodiments, the representation may comprise an incremental backup that includes the one or more data units that have been modified. The processing module may direct the at least one processor to, for each data unit in the set of data units, add a data unit from the incremental backup corresponding to the data unit of the set of data units to the delta if the bit corresponding to the data unit of the set of data units in the third bitmap is set and the bit corresponding to the data unit of the set of data units in the first bitmap is set. The processing module may also direct the at least one processor to, for each data unit in the set of data units, add a reference to a data unit in the first full backup if the bit corresponding to the data unit of the set of data units in the third bitmap is set and the bit corresponding to the data unit of the set of data units in the first bitmap is not set. In at least one embodiment, the set of data units may comprise a data volume, and each data unit in the set of data units may include a data block.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

I claim:

1. A computer-implemented method, at least a portion of the method being performed by a computing system comprising at least one processor, the method comprising:

creating a first backup of a set of data units at a first point in time;

creating, at a second point in time, a representation of one or more data units in the set of data units that have been modified since the first point in time, wherein the representation of one or more data units that have been modified since the first point in time comprises:

a first bitmap that indicates each data unit in the set of data units that has changed since the first point in time;

a second bitmap that indicates a state of each data unit in the set of data units at the first point in time, wherein the state of each data unit at the first point in time indicates whether data is being stored in the data unit at the first point in time;

a third bitmap that indicates a state of each data unit in the set of data units at the second point in time, wherein the state of each data unit at the second point in time indicates whether data is being stored in the data unit at the second point in time;

creating, based at least in part on the representation of one or more data units that have been modified since the first point in time, a delta that comprises data for updating the first backup to a second backup by comparing the first, second, and third bitmaps, wherein the delta represents a difference between the state of the set of data units at the first point in time and the state of the set of data units at the second point in time, and the data for updating the first backup to the second backup comprises:

at least one reference to a data unit in the first backup, the reference identifying a data unit that was present in the set of data units at both the first and second points in time;

at least one data unit that was modified in the set of data units between the first and second points in time;

using the delta to update the first backup to the second backup that comprises modifications made to the set of data units between the first and second points in time, wherein using the delta to update the first backup comprises updating data units in the first backup with the at least one data unit that was modified between the first and second points in time.

2. The computer-implemented method of claim 1, wherein:
creating, at the second point in time, the representation of one or more data units in the set of data units that have been modified since the first point in time comprises creating, in addition to the representation, an incremental backup that includes one or more data units in the set of data units that have been modified since the first point in time;

creating the delta comprises, for each data unit in the set of data units:

adding a data unit from the incremental backup corresponding to the data unit of the set of data units to the delta if a bit corresponding to the data unit of the set of data units in the third bitmap is set and a bit corresponding to the data unit of the set of data units in the first bitmap is set;

adding a reference to a data unit in the first backup if the bit corresponding to the data unit of the set of data units in the third bitmap is set and the bit corresponding to the data unit of the set of data units in the first bitmap is not set.

3. The computer-implemented method of claim 1, wherein:
the delta comprises a delta stream sent from a client system to a backup system that stores the first backup;
the first backup comprises backup data from the client system;
the client system creates the delta stream;
the delta stream comprises a stream of data that includes the one or more data units that have been modified since the first point in time;
the delta stream is created on the fly without first creating an incremental backup.

4. The computer-implemented method of claim 1, wherein creating the delta comprises:
sending the representation of the one or more data units that have been modified from a client system to a backup system, wherein the backup system backs up data from the client system;
processing, at the backup system, the representation of the one or more data units that have been modified to create the delta.

5. The computer-implemented method of claim 1, wherein the reference to the data unit that was present in the set of data units at both the first and second points in time comprises at least one of a reference to a data unit that moved from a first location to a second location within the set of data units between the first and second points in time.

6. The computer-implemented method of claim 1, wherein:
the representation of one or more data units that have been modified since the first point in time comprises an incremental backup;
creating the delta comprises converting the incremental backup into a delta.

7. The computer-implemented method of claim 1, further comprising:
identifying the one or more data units in the set of data units that have been modified since the first point in time by tracking modifications to the set of data units.

8. The computer-implemented method of claim 7, further comprising:
identifying the one or more data units in the set of data units that have been modified since the first point in time by reading archive bits associated with files in the set of data units.

9. The computer-implemented method of claim 1, further comprising:
sending the difference to a data deduplication system, wherein a backup system creates the first backup on the data deduplication system and creating the delta that comprises data for updating the first backup to a second backup comprises deduplicating data in the difference and the first backup;
deduplicating only the data units that have been modified since the first point in time such that complete individual files are present in the second backup to enable the deduplication system to identify the complete individual files within the second backup.

10. The computer-implemented method of claim 1, further comprising:
creating, at a third point in time, a representation of one or more data units in the set of data units that have been modified since the second point in time;
determining, based at least in part on the representation of one or more data units that have been modified since the second point in time, a difference between the state of the set of data units at the second point in time and a state of the set of data units at the third point in time;

using the difference to update the second backup to a third backup that comprises modifications made to the set of data units between the second and third points in time.

11. A system comprising:
at least one processor;
a backup module that directs the at least one processor to:
  create a first backup of a set of data units at a first point in time;
  create, at a second point in time, a representation of one or more data units in the set of data units that have been modified since the first point in time, wherein the representation of one or more data units that have been modified since the first point in time comprises:
    a first bitmap that indicates each data unit in the set of data units that has changed since the first point in time;
    a second bitmap that indicates a state of each data unit in the set of data units at the first point in time, wherein the state of each data unit at the first point in time indicates whether data is being stored in the data unit at the first point in time;
    a third bitmap that indicates a state of each data unit in the set of data units at the second point in time, wherein the state of each data unit at the second point in time indicates whether data is being stored in the data unit at the second point in time;
at least one storage device configured to store the first backup;
a processing module that directs the at least one processor to:
  create, based at least in part on the representation of one or more data units that have been modified since the first point in time, a delta that comprises data for updating the first backup to a second backup by comparing the first, second, and third bitmaps, wherein the delta represents a difference between the state of the set of data units at the first point in time and the state of the set of data units at the second point in time, and the data for updating the first backup to the second backup comprises:
    at least one reference to a data unit in the first backup, the reference identifying a data unit that was present in the set of data units at both the first and second points in time;
    at least one data unit that was modified in the set of data units between the first and second points in time;
an update module that directs the at least one processor to:
  use the delta to update the first backup by modifying the first backup such that the first backup becomes a second backup that comprises modifications made to the set of data units between the first and second points in time.

12. The system of claim 11, wherein the processing module is programmed to create the delta by, for each data unit in the set of data units, comparing bits in the first, second, and third bitmaps that are associated with the data unit to determine whether to add a reference to the data unit or a modified version of the data unit to the delta.

13. The system of claim 11, wherein:
the delta comprises a delta stream sent to a backup system that stores the first backup;
the delta stream comprises a stream of data that includes the one or more data units that have been modified since the first point in time;
the delta stream comprises information regarding how the one or more data units that have been modified since the first point in time map to the first backup.

14. The system of claim 11, wherein:
the delta comprises a delta file that includes the one or more data units that have been modified since the first point in time.

15. The system of claim 11, wherein:
the processing module is programmed to create the delta by iterating through the representation of the one or more data units in the set of data units that have been modified since the first point in time to determine whether to add references to the data units or modified data units to the delta.

16. A computer-readable-storage medium comprising one or more computer-executable instructions that, when executed by a computing device comprising at least one processor, cause the computing device to:
  create a first backup of a set of data units at a first point in time;
  create, at a second point in time, a representation of one or more data units in the set of data units that have been modified since the first point in time, wherein the representation of one or more data units that have been modified since the first point in time comprises:
    a first bitmap that indicates each data unit in the set of data units that has changed since the first point in time;
    a second bitmap that indicates a state of each data unit in the set of data units at the first point in time, wherein the state of each data unit at the first point in time indicates whether data is being stored in the data unit at the first point in time;
    a third bitmap that indicates a state of each data unit in the set of data units at the second point in time, wherein the state of each data unit at the second point in time indicates whether data is being stored in the data unit at the second point in time;
  create, based at least in part on the representation of one or more data units that have been modified since the first point in time, a delta that comprises data for updating the first backup to a second backup by comparing the first, second, and third bitmaps, the data for updating the first backup to the second backup comprising:
    at least one reference to a data unit in the first backup, the reference identifying a data unit that was present in the set of data units at both the first and second points in time;
    at least one data unit that was modified in the set of data units between the first and second points in time;
  use the difference to update the first backup to a second backup that comprises modifications made to the set of data units between the first and second points in time.

17. The computer-readable-storage medium of claim 16, wherein:
the one or more computer-executable instructions are programmed to cause the computing device to:
  add a modified data unit to the delta if a bit corresponding to the data unit of the set of data units in the third bitmap is set and a bit corresponding to the data unit of the set of data units in the first bitmap is set;
  add a reference to a data unit in the first backup if the bit corresponding to the data unit of the set of data units in the third bitmap is set and the bit corresponding to the data unit of the set of data units in the first bitmap is not set.

18. The computer-implemented method of claim 1, wherein the data unit that was modified in the set of data units between the first and second points in time comprises a data unit that was not present in the set of data units at the first point in time but was present in the set of data units at the second point in time.

\* \* \* \* \*